May 1, 1934.  A. RONNING  1,957,079

POWER DRIVEN MOWING MACHINE

Filed April 10, 1931  3 Sheets-Sheet 2

INVENTOR
Adolph Ronning
BY
Andrew E. Carlsen
ATTORNEY

May 1, 1934.  A. RONNING  1,957,079
POWER DRIVEN MOWING MACHINE
Filed April 10, 1931   3 Sheets-Sheet 3

INVENTOR
Adolph Ronning
BY
Andrew C. Barber
ATTORNEY

Patented May 1, 1934

1,957,079

UNITED STATES PATENT OFFICE 1,957,079

POWER DRIVEN MOWING MACHINE

Adolph Ronning, Minneapolis, Minn.

Application April 10, 1931, Serial No. 529,015

17 Claims. (Cl. 56—7)

This invention concerns itself with power driven lawn mowers and the primary object is to provide an efficient, practical, and highly novel construction of motor propelled mower that is particularly adaptable for cutting lawns of relatively large areas such as are found in golf courses, aviation fields, city parks, cemeteries, campuses, etc. More particularly the object is to provide a series of individual mower units with connections therewith to the power or traction unit, which connections are so designed as to permit the proper flexibility of movement of each unit with respect to the ground surface contour, and with respect to the traction unit, without in any way interfering with the draft or propelling connections for the respective units. A further object is to so arrange the mower units and connect them with respect to the tractor that said units will cut a wide and uniform swath and will all initially engage the grass in advance of or before it is traversed by any of the tractor supporting wheels, so that there will be no possibility of the grass being left uncut because of having been pressed down below reach of the cutting knives. A further object is to provide a practical mower unit attachment for standard or conventional types of tractors including a mower frame extending rearwardly of and laterally with respect to the tractor for attachment thereto, and for adjustments with respect thereto whereby certain adjustments may be made to the mower units, collectively, by related adjustments to the mower frame. A further object is to provide a mower attachment for tractors including manual adjusters for changing the angle or direction of travel of the mower units, and means for connecting such adjusters with steering and braking mechanisms of the tractor whereby there will be a coordination of control and action as between the mowing mechanism and the propelling unit. As a departure from the conventional types of mower units proper having the individual lateral driving wheels, I propose, as a further and more detailed object of the invention, to provide a mower unit with a motor, operated entirely independently of such driving wheels, for driving the cutting reel or blades, thus eliminating many troubles incident to inconsistent speed and power, and slippage as found in the driving wheel type of unit. Still other and more detailed objects of the invention will be disclosed and discussed in the course of the following specification, reference being had to the accompanying drawings, in which:

Figure 1:
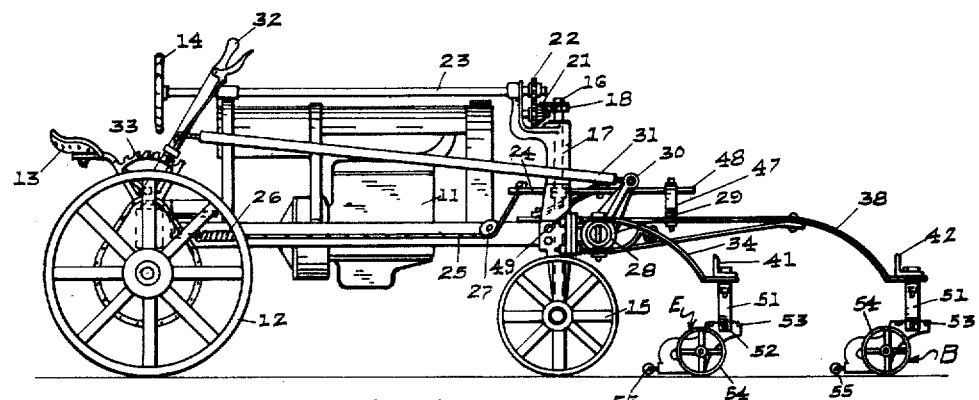
Fig. 1 is a side elevation of a preferred embodiment of my invention, showing the mowing mechanism as applied to an ordinary or popular type of tractor.

Referring to the drawings more particularly and by reference characters, 11 designates the engine or power unit of a more or less standard or conventional style of tractor having traction wheels 12, an operator's station 13, and a steering hand wheel 14. The traction wheels 12 are driven by the engine 11 through the usual transmission and differential mechanisms (not shown). The front end of the tractor is supported by a steering carriage comprising a pair of wheels 15 secured to the lower end of a vertical shaft 16 which is journaled in a casting 17 at the front end of the tractor frame and is provided at its upper end with a bevel gear segment 18. This segment meshes with a bevel pinion 19 mounted on a stub shaft 20 in the casting 17. The pinion 19 carries a spur gear 21 which meshes with a spur pinion 22 on the front end of a shaft 23, to the rear end of which shaft is secured the hand wheel 14. It will thus be seen that by turning the hand wheel 14 the operator stationed on the seat 13 will operate the steering wheels 15 through the members 23, 22, 21, 19, 18, and 16.

It may here be noted that the steering column or shaft 16 is provided with a rearwardly extending arm 24 which is connected by cables such as 25 to the brakes of the respective traction wheels 12, and these cables are preferably provided with elastic elements such as springs 26 so as to permit a certain resiliency as between the steering column 16 and the brakes, particularly, after either one of said brakes may have been pulled into a tight or closed position. The cables 25 may be suitably mounted or guided by pulleys 27 and are intended to tighten the brakes of either one of the traction wheels 12 when the steering wheels 15 have been turned to a predetermined angle. In other words, when it is desired to make a relatively sharp turn with the tractor the wheels 15 are turned to a comparatively sharp angle, at which time one of the traction wheel brakes 12 is engaged to momentarily prevent the rotation thereof; and the stopping of said wheel operates through the differential mechanism of the tractor to speed up the opposite traction wheel, and consequently the wheel held against rotation will serve as a pivot point for the turning movement of the tractor.

In the preferred embodiment of the mower mechanism, as illustrated in Figs. 1, 2, 3, and 6, I mount a tubular beam 28 in suitable bearing extensions 29 secured to the casting 17 of the tractor. This beam 28 is employed to serve as a primary mounting for the mower units and is rotatable in the bearings 29 so that when moved in an anti-clockwise direction, as seen in Fig. 1, it will operate to raise the mower units from the ground. The beam 28 is oscillated through the medium of a bracket arm 30 rigidly mounted on the beam and connected by a connecting rod 31 to a hand lever 32 mounted within reach of the tractor operator and held in variously adjusted positions by a toothed rack 33, the notches of which are selectively engaged by a movable pawl carried by the hand lever 32.

Figure 9:
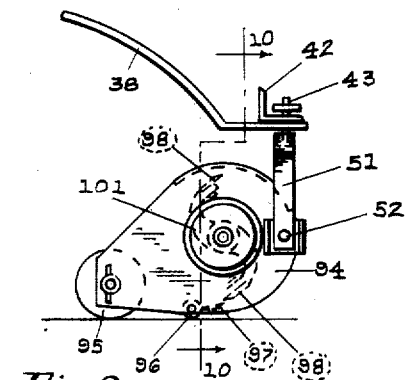
Fig. 9 is an enlarged end view of a modified form of mower unit showing the same as having cutting blades driven by an electric motor carried by the unit.
Figure 10:
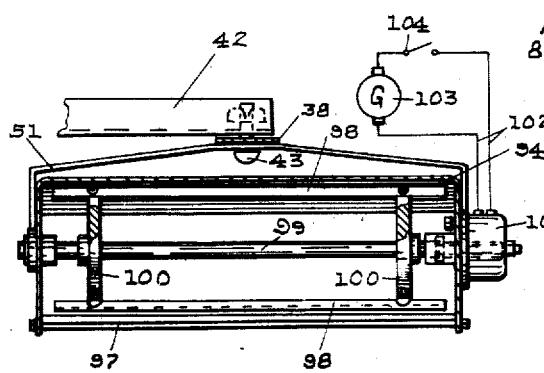
Fig. 10 is a longitudinal sectional elevation of the mower unit as seen on the line 10—10 in Fig. 9.

The mowing units, conveniently designated by letters A, B, C, D, and E, are arranged in two rows or gangs, a rear row with the units C, D, and E somewhat spaced from each other, and a front pair or row of units, A and B, which cut swaths traversing the spaces between the rear units; and the staggered arrangement of units, as thus described, will obviously cut a total width of strip that is defined by the outermost cutting units C and E. Each of the mowing units may be of the ordinary or standard design having a cutting reel driven by lateral supporting wheels, or, the new type of unit such as shown in Figs. 9 and 10, and later to be described, may be used.

The units C, D, and E are each secured to the tubular beam 28 by semi-resilient spring arms 34, the rear end of which is forked, as at 35, and is secured to the beam as by a bolt 36. The fork arm 35 has a slot 37 (Fig. 6) to receive the lower end of the bolt, and the purpose of this slot is to give full oscillating freedom to the arm 34 with respect to the beam 28 during the mowing operation, so that each unit may follow the undulations of the ground surface independently of the others and without any binding action. When the hand lever 32 is pulled back to raise the mower units out of contact with the ground, as when moving the machine from one field or lawn to another, the lower ends of the bolts 36 engage the forward ends of the slots 37 to simultaneously raise the three mowers C, D, and E completely out of engagement with the ground. The front mower units are attached to the beam 28 by arms 38 and bolts 39, similar in all respects to the arms 34 and bolts 36, except that the arms 38 are necessarily longer than the arms 34.

The mower units of each row are maintained in properly spaced relation with respect to each other by tie bars 40, 41, and 42, the tie bar 40 connecting mowers C and D, bar 41 connecting D and E, and tie bar 42 connecting mowers A and B. These tie bars are secured to the front ends of the arms 34 and 38 by pivot pins 43, all of which are relatively loose so that they will in no way interfere with the relative up and down movements of the mowers. It may here be noted that a relatively stiff coil spring 44 is mounted upon the tubular beam 28 and has one end secured thereto while its other end is anchored in the bearing bracket or casting 29, and this spring is provided with a spring torque or tension which at all times tends to counterbalance the weight of the mower units, and consequently offers considerable assistance to the operator when he wishes to lift the mowers off of the ground.

Figure 3:
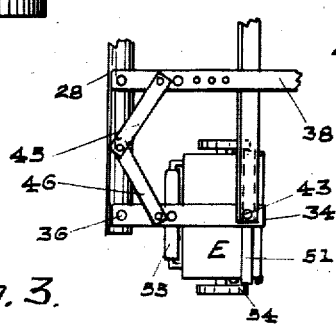
Fig. 3 is a detail plan view corresponding to a portion of Fig. 1, but showing certain brace rods as applied thereto.

Under some circumstances and with certain types of tractor hook-ups it may be found unnecessary to provide for any shifting action, as between the front and rear rows of mower units, and in such instances the mower arms 34 and 38 are held against shifting action by a pair of detachable brace rods 45 and 46 connecting them to the beam 28, as shown in Fig. 3. Ordinarily, however, either one or both of the mower rows should be shiftable and connected with the steering mechanism so that they will be shifted thereby when the machine is being driven in other than a straight direction. Otherwise the two front mowers A and B will not properly cut the strip of lawn which passes between the mower units C and D, and D and E. As previously indicated, however, various kinds of shifting movements will be required for different types of machines, the dimensions of various parts, tractor make, and arrangement of different members all being determining factors. Thus, it may be found desirable to effect a shifting action to the forward units A and B only, and in that event I disconnect or remove the brace rod 45 and then connect one of the arms 38 with a rod 47 to an arm 48 extending rigidly forwardly from the steering column 16.

When the tractor is now steered to either side the mower gang A—B will be shifted to the same side so as to operate over the arcuate or curved grass strips that pass between the gang units C—D—E. If it is found desirable to effect a shifting action to the rear mower gang C—E then the brace rod 45 is retained, but the brace rod 46 is removed and one of the mower arms 34 is connected to the steering post arm 48 as by a rod 49, the mower arm in question, however, having a rearward extension 50 to which the rod 49 is secured so as to give the proper direction of shifting movement to the mowers. In many instances it will no doubt be found preferable to produce a combination reverse shifting action as between the front and rear mower gangs, when the machine is to be turned, and to that end both of the tie bars 47 and 49 are employed.

When the machine is now turned for instance to the right, the mower units A and B will also move to the right and the mower units C—E will shift slightly to the left so as to fall into proper cutting positions with respect to the forward units. In any event it will be noted that the bars or rods 47, 48, 49, and 50 are liberally provided with perforations for selective engagement by the various connecting pins, so that various adjustments can be made as may be found necessary.

The mower units A—E are each secured to the respective pivot pins 43 by bail members 51 which have loose or universal attachment to the pins 43 to prevent any binding action. The ends of the bails are pivoted to the ends of the mower units, as at 52, but the freedom of pivoting action by the units proper is limited by pairs of lugs 53 extending from the units at opposite sides of each strap end. The primary purpose of these lugs is to insure a proper operative position for the units even when they are swung up off the ground by the arms 34 and 38. As the bails 51 are all secured forwardly to the mower frames it will be understood that the units will have a trailing or caster action behind the pivot centers 43, and without interfering with the cutter unit drive wheels 54 or the usual cutter depth adjuster rollers 55.

Figure 2:
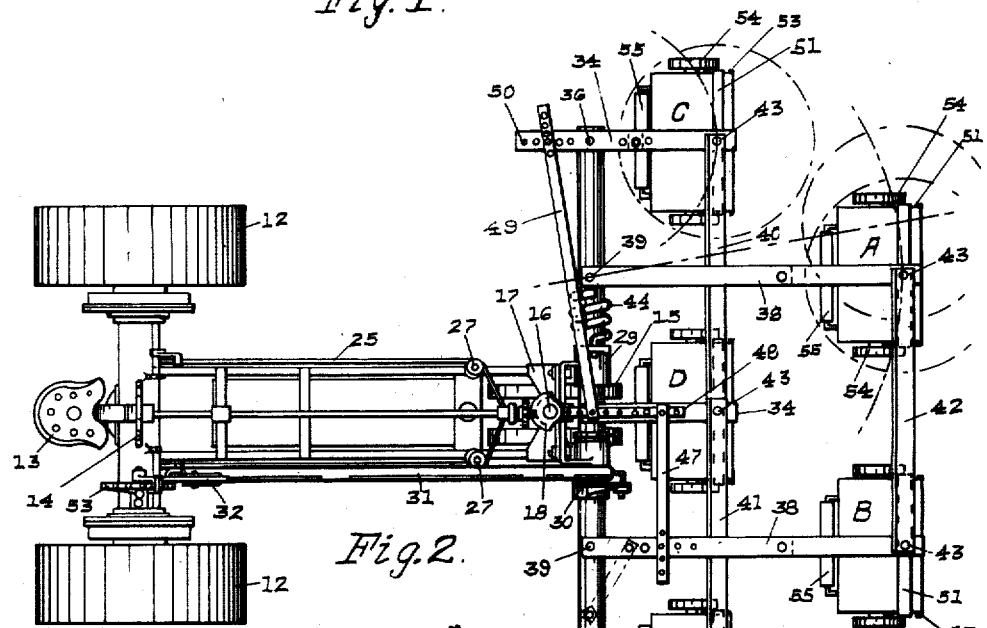
Fig. 2 is a plan view of the structure illustrated in Fig. 1.
Figure 4:
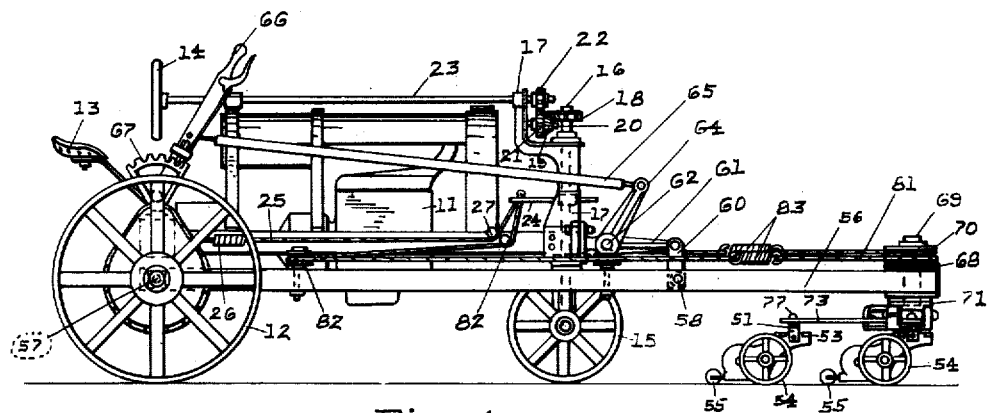
Fig. 4 is a side elevation of a modified form of the invention.
Figure 5:
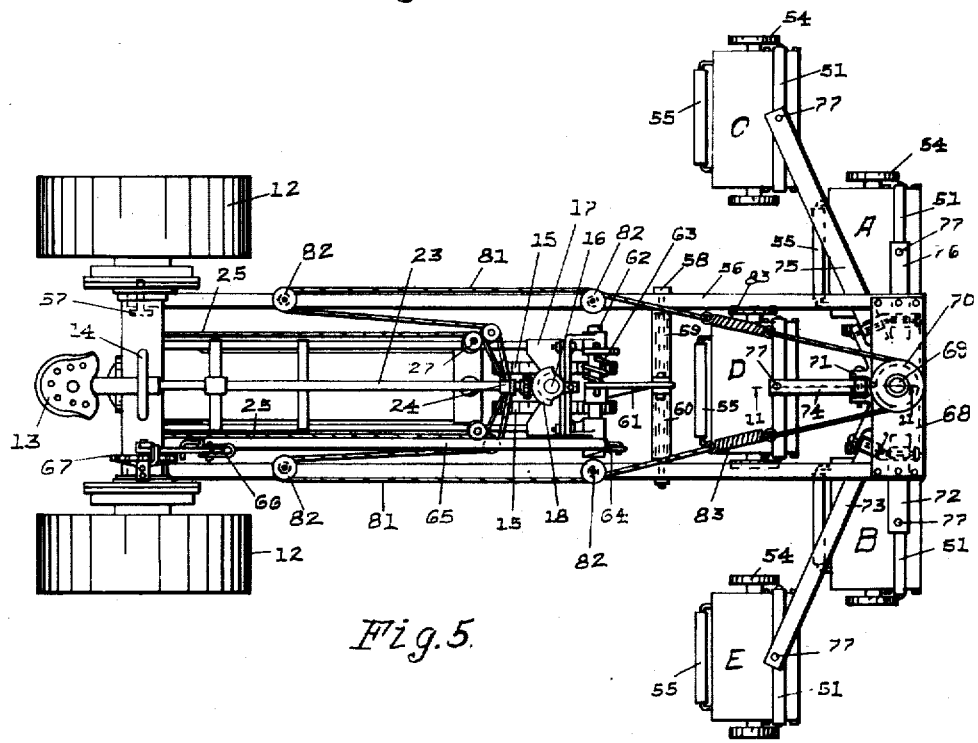
Fig. 5 is a plan view of the machine shown in Fig. 4.
Figure 11:
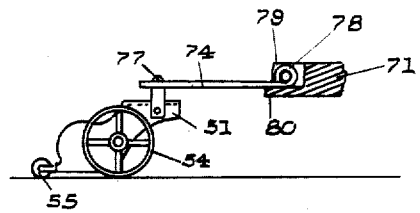
Fig. 11 is a detail sectional elevation on the line 11—11 in Fig. 5.
Figure 6:
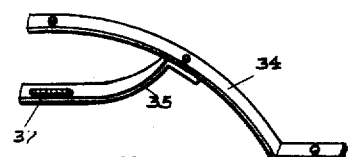
Fig. 6 is a detail perspective view of one of the mower unit supporting arms used in the machine shown in Figs. 1 and 2.

In the modification shown in Figs. 4, 5, and 11, the tubular supporting beam 28, as employed in the structure shown in Figs. 1 and 2, is entirely eliminated and the mower units are supported in this instance by the forward end of a frame 56 which extends considerably in advance of the tractor and has a pair of lateral rails or side bars that extend back and are pivotally secured to the rear end of the tractor by pivot pins 57, which pins hold the frame in alignment with the tractor to permit the front end of the frame to be oscillated up and down with respect to the tractor. At a point between the front end of the frame 56 and the front end of the tractor the side bars of the frame 56 are connected by a bolt 58 which extends through a spacing sleeve 59 and also serves to pivotally secure the ends of a bail 60 to the frame. This bail 60 is pivotally secured at a middle point to an arm 61 of a shaft 62 journaled to the front end of the tractor, and this shaft 62 is provided with a spring 63 arranged to exert a lifting action on the arm 61 so as to partially counterbalance the weight of the frame 56 and the mower units A to E inclusive, in much the same manner as the spring 44 counterbalances the weight of the mowers and mower arms shown in Figs. 1 and 2.

One end of the shaft 62 is provided with a crank arm 64 that is connected as by a rod 65 to a hand lever 66 that operates in connection with a segment 67 at the rear end of the tractor. Thus by manipulating the hand lever 66 the operator, while at his usual station on the tractor, is able to raise and lower the frame 56 as may be found necessary during the operation of the mowers, or he may raise the frame so as to entirely lift the mower units out of contact with the ground.

At its front end the frame 56 has a cross plate or beam 68 through which extends and is journaled a vertical shaft 69 to the upper end of which is secured a pulley 70. The lower end of the shaft 69 is secured to a casting 71 having a plurality of recesses for pivotally receiving a series of mower supporting spring arms 72 to 76 inclusive, all of which are arranged in radial or fan like formation and are of different lengths so that their outer ends can be conveniently attached to the mower units A to E, which will be noted from Fig. 5, and are arranged in the same manner as shown in Fig. 2. The outer ends of the arms 72 to 76 inclusive are secured as by pivot pins 77 to the respective bails 51 of the various mower units, and these pivot pins operate to actuate the mower units over the ground in substantially the same manner as the pivot pins 43, referred to in connection with Figs. 1 and 2, actuate the previously described mower units.

The inner ends of the arms 72 to 76 inclusive are pivotally secured as at 78 in recesses 79 in the casting 71, as shown particularly in Fig. 11, and these recesses and pivot connections are so arranged that the supporting arms 74, while being freely movable upwardly, are limited in their downward movement by shoulder extensions 80 of the casting 71. Consequently it will be seen that when the frame 56 is lifted up the shoulders 80 will engage the mower arms 72 to 76 inclusive and will entirely lift all of the mower units from the ground when the hand lever 66 is pulled back sufficiently.

The steering or proper guiding of the mower units, as shown in Figs. 4 and 5, is effected by a cable 81 which passes over the pulley 70 of the shaft 69, and then rearwardly and laterally over guide pulleys 82 and terminates or is anchored to the arm 24 of the steering column 16, which arm also controls the brake cables 25, as previously described. Thus, when the tractor forecarriage 15 is steered to one side or the other it will be seen that the arm 24 will operate through the cables 81 and the pulley 70 to swing the entire gang of mower units A to E inclusive on the center or vertical axis 69. It may here be noted that the cable 81 is provided at points rearwardly of the pulley 70 with a pair of springs 83, one of which is to keep the cable 81 taut at all times and also to allow for the slight difference in the length thereof, which must be provided to compensate for the oscillating movement of the frame 56 with respect to the tractor.

Figure 8:
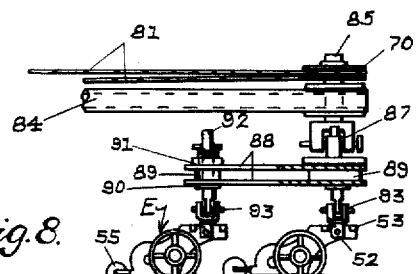
Fig. 8 is a side elevation of the structure shown in Fig. 7, with a part thereof in section, as on the line 8—8 in Fig. 7.
Figure 7:
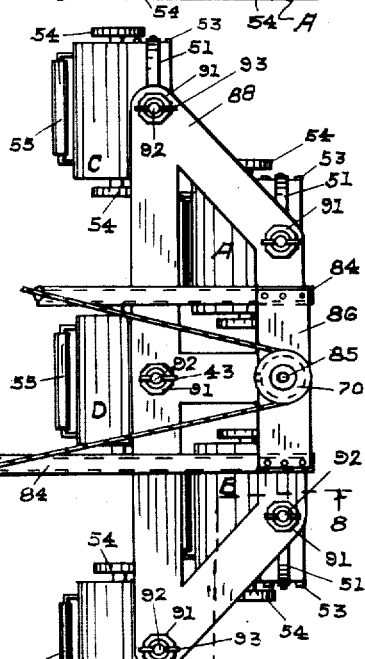
Fig. 7 is a plan view of a mower gang having a supporting frame structure that includes further modifications over that illustrated in Figs. 1 and 2.

In the modification shown in Figs. 7 and 8 the five mower units A to E inclusive are disposed in the same relative arrangement with respect to each other as in Figs. 2 and 5, and a frame 84 is used which is similar in all substantial respects to the frame 56, as shown in Fig. 5, although I find it preferable to make the side bars of the frame of tubular steel which of course may also be done with the frame structure, as shown in Fig. 5.

The front end of the frame 84 has a short vertical shaft 85 that is similar to the previously described shaft 69 and is journaled in a pair of cross plates 86 and has the pulley 70 operated by the cable 81. The lower end of the shaft 85 has a universal joint connection 87 (see Fig. 8) with a frame 88 made up of a pair of spaced plate members. These plate members serve to reinforce each other and give the frame a substantially rigid construction. The plates are held apart by spacing rings or collars 89, one directly under the shaft 85, and one adjacent to each mower unit. Each of the mower unit collars 89 is secured in place by a tubular bolt 90 which passes upwardly through the plates 88 and the member 89, and is externally threaded to receive a nut 91. The tubular bolt 90 then slidably receives a vertical pin 92, the lower end of which is universally connected as at 93 to the adjacent mower unit, and the pin is prevented from dropping down through the tubular bolt 90 by a cross or cotter pin 93.

From the foregoing construction it will be seen that the universal joint 87 provides a substantial freedom of movement for the frame 88 so that the latter may tilt laterally or in any required angle to meet the general surface condition of the the ground, and the universal joints 93 will of course permit the individual mower units to follow the undulations of the ground surface which it traverses; while the vertical movement of the respective pins or bolts 92 in the tubular members 90 will allow further for the various mower units to follow the ground so that any one of them may for instance drop below the average level of the others, if necessary, and where such ground conditions may require. The universal joints 93 connect the lower ends of the members 92 to the respective mower units through bails 51 which are attached to the mower units proper by the pivots 52, and operate between the lugs 53 as previously described in connection with the structures illustrated in Figs. 1 to 5, inclusive.

In Figs. 9 and 10 I have illustrated a specific type of mower unit which may be attached to and carried by the machine in the same manner as has already been described, and the purpose of this disclosure is to provide means which will eliminate the necessity of mower unit traction wheels such as 54, and which will provide a positive driving engagement for the mower unit irrespective of any traction mechanism. The mower unit here shown comprises a shell or housing 94 secured at its ends to the bail 51. The rear end of the housing has a roller 95 for engagement with the ground, and a comparatively small adjustable roller 96 by which the cutting depth of the unit is regulated. A ledger plate 97 is of ordinary construction but the cutting reel is somewhat different from the conventional type of lawn mower cutter in that it may employ straight blades 98 in preference to the spiral type of blade which is more costly and harder to keep properly ground.

The blades 98 are connected to a drive shaft 99 by spokes 100, and at one end of the shaft 99 the housing 94 is provided with an electric motor 101 for driving the cutting reel 98—100. The motor 101 is connected in circuit by wires 102 to a generator 103, and the circuit in question is controlled by a conventional switch 104. The generator 103 is of course preferably operated directly from the tractor engine of the machine. With a mower unit of this type a very high speed of rotation can be had and it is therefore not absolutely necessary that the blades 98 have sheering contact with the ledger plate 97. In fact it is preferable to slightly space these cutting members.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with a tractor having a steerable unit supporting the front end thereof, of a gang of lawn mower units arranged adjacent the forward end of the tractor and connected therewith, and means operative independently of forward movement of the tractor for shifting at least one of the units transversely of the machine and in conjunction with the operation of said steerable tractor unit, said shifting means being separate from but operatively connected with the steerable unit.

2. The combination with a tractor having a steering member, of a gang of lawn mowers arranged adjacent to the forward end of the tractor and connected therewith, means for raising the mower gang out of engagement with the ground and so that it may be carried entirely by the tractor, and means separate from but operably connected with the tractor steering member for shifting at least one of the mowers in a horizontal plane and about a center that is removed with respect to the center of the tractor steering member.

3. The combination with a tractor, of a gang of lawn mowers arranged adjacent to the forward end of the tractor and connected therewith, means for raising the mower gang out of engagement with the ground and so that it may be carried entirely by the tractor, and means for shifting at least one of the mowers about a center that is removed with respect to the center of the tractor steering member, said shifting means being operatively associated with the tractor steering mechanism so as to be actuable in conjunction therewith.

4. The combination with a tractor, of a gang of lawn mowers arranged adjacent to the forward end of the tractor and connected therewith, means for raising the mower gang out of engagement with the ground and so that it may be carried entirely by the tractor, and means for shifting at least one of the mowers about a center that is removed with respect to the center of the tractor steering member, said shifting means being operatively associated with the tractor steering mechanism so as to be actuable in conjunction therewith, and pivots attaching each mower unit to its tractor connection whereby the mower unit will have a free trailing or caster action on the ground.

5. The combination with a tractor having an operator's station at the rear, a steering carriage at the front, and steering control members extending from the carriage to within reach of the driver at said station, of a gang of lawn mowers adjustably carried by the tractor adjacent the front end thereof, means operable from the said tractor station for rendering the mowers inactive, and means connecting at least certain of the mowers with the steering control members to transversely shift such mowers simultaneously with adjustments to the steering carriage.

6. A power mower comprising a self-propelled steerable vehicle, an oscillatable cross beam carried by the front end of the vehicle and extending to both sides thereof, a gang of mower units, arms connecting the mower units to the cross beam, and means independent of the arms for rotating the cross beam to raise the arms and thereby move the mower units into inoperative positions.

7. A power mower comprising a self-propelled steerable vehicle, an oscillatable cross beam carried by the front end of the vehicle and extending to both sides thereof, a gang of mower units, arms connecting the mower units to the cross beam, means for rotating the cross beam to lift the mower units, and means connecting certain of the mower units with the steering mechanism of the vehicle whereby such units may be steered or shifted with respect to the vehicle but in synchronism with movements of the steering mechanism.

8. The combination with a tractor having a steering mechanism, of a gang of lawn mowers arranged adjacent the front of the tractor so as to be propelled thereby, and means for optionally connecting the mowers with the tractor and steering mechanism whereby the mowers will either be shifted in conjunction with the steering mechanism or be held relatively stationary with respect to the tractor.

9. A power mower comprising a tractor, a tubular cross beam carried by the tractor, arms extending substantially at right angles from the cross beam, mower units carried by said arms, and means for rotating the cross beam to raise the arms and mower units.

10. The combination with a tractor having a steering mechanism, of a gang of lawn mowers arranged adjacent the front of the tractor so as to be propelled thereby, and means associated with said steering mechanism for shifting certain of said mowers in one direction and certain other of said mowers in another direction when the tractor is turned to either side.

11. The combination with a tractor, of a cross beam carried thereby, arms extending from the cross beam for supporting a gang of mower units, said arms having freedom for limited vertical swinging movements with respect to the cross beam when the mower units are operating, and means for simultaneously actuating all of said arms to lift the mower units from the ground.

12. The combination with a tractor, of a frame pivotally connected to a rear part of the tractor and extending forwardly of the front end of the tractor, means for vertically adjusting the front end of the frame, and a gang of lawn mowers carried by said front end of the frame.

13. The combination with a tractor, of a frame pivotally connected at its rear end to the tractor with its front end extending forwardly of the tractor, a second frame pivotally secured to the front end of the first mentioned frame, a gang of lawn mowers carried by said second frame, and means connected to and operated by the steering mechanism of the tractor for turning the second frame on its pivot engagement with the first mentioned frame.

14. A mower attachment for tractors comprising a main frame extending forwardly from and pivoted at its rear to the tractor, a secondary frame carried under the front end of the main frame and universally connected therewith, a gang of lawn mowers carried by the secondary frame and each being universally connected therewith in advance of its point of ground contact so as to be drawn in trailing contact with the ground, and means connected to the tractor steering mechanism for turning the second frame on its pivot connection with the first mentioned frame.

15. A mower attachment for tractors comprising a main frame extending forwardly from the tractor, a secondary frame carried under the front end of the main frame and universally connected therewith, and a gang of lawn mowers carried by the secondary frame and each being universally connected therewith for trailing contact with the ground, and means operative from the tractor for steerably angling the secondary frame with respect to the main frame.

16. A mower attachment for tractors comprising a main frame extending forwardly from the tractor, a secondary frame carried under the front end of the main frame and universally connected therewith, and a gang of lawn mowers carried by the secondary frame and each being universally connected therewith for trailing contact with the ground, and means for providing limited freedom for vertical self-adjustment of the mowers with respect to each other.

17. A power mower comprising a tractor, a cross beam carried by the tractor, arms extending substantially at right angles from the cross beam, mower units carried by said arms, and means for rotating the cross beam to raise the arms and mower units.

ADOLPH RONNING.

DISCLAIMER 1,957,079.—*Adolph Ronning*, Minneapolis, Minn. POWER DRIVEN MOWING MACHINE. Patent dated May 1, 1934. Disclaimer filed June 19, 1935, by the assignee, *Toro Manufacturing Company*.

Hereby enters this disclaimer to claim 1 of said Letters Patent which is in the following words, to wit:

"1. The combination with a tractor having a steerable unit supporting the front end thereof, of a gang of lawn mower units arranged adjacent the forward end of the tractor and connected therewith, and means operative independently of forward movement of the tractor for shifting at least one of the units transversely of the machine and in conjunction with the operation of said steerable tractor unit, said shifting means being separate from but operatively connected with the steerable unit."

[*Official Gazette July 16, 1935.*]

mechanism or be held relatively stationary with respect to the tractor.

9. A power mower comprising a tractor, a tubular cross beam carried by the tractor, arms extending substantially at right angles from the cross beam, mower units carried by said arms, and means for rotating the cross beam to raise the arms and mower units.

10. The combination with a tractor having a steering mechanism, of a gang of lawn mowers arranged adjacent the front of the tractor so as to be propelled thereby, and means associated with said steering mechanism for shifting certain of said mowers in one direction and certain other of said mowers in another direction when the tractor is turned to either side.

11. The combination with a tractor, of a cross beam carried thereby, arms extending from the cross beam for supporting a gang of mower units, said arms having freedom for limited vertical swinging movements with respect to the cross beam when the mower units are operating, and means for simultaneously actuating all of said arms to lift the mower units from the ground.

12. The combination with a tractor, of a frame pivotally connected to a rear part of the tractor and extending forwardly of the front end of the tractor, means for vertically adjusting the front end of the frame, and a gang of lawn mowers carried by said front end of the frame.

13. The combination with a tractor, of a frame pivotally connected at its rear end to the tractor with its front end extending forwardly of the tractor, a second frame pivotally secured to the front end of the first mentioned frame, a gang of lawn mowers carried by said second frame, and means connected to and operated by the steering mechanism of the tractor for turning the second frame on its pivot engagement with the first mentioned frame.

14. A mower attachment for tractors comprising a main frame extending forwardly from and pivoted at its rear to the tractor, a secondary frame carried under the front end of the main frame and universally connected therewith, a gang of lawn mowers carried by the secondary frame and each being universally connected therewith in advance of its point of ground contact so as to be drawn in trailing contact with the ground, and means connected to the tractor steering mechanism for turning the second frame on its pivot connection with the first mentioned frame.

15. A mower attachment for tractors comprising a main frame extending forwardly from the tractor, a secondary frame carried under the front end of the main frame and universally connected therewith, and a gang of lawn mowers carried by the secondary frame and each being universally connected therewith for trailing contact with the ground, and means operative from the tractor for steerably angling the secondary frame with respect to the main frame.

16. A mower attachment for tractors comprising a main frame extending forwardly from the tractor, a secondary frame carried under the front end of the main frame and universally connected therewith, and a gang of lawn mowers carried by the secondary frame and each being universally connected therewith for trailing contact with the ground, and means for providing limited freedom for vertical self-adjustment of the mowers with respect to each other.

17. A power mower comprising a tractor, a cross beam carried by the tractor, arms extending substantially at right angles from the cross beam, mower units carried by said arms, and means for rotating the cross beam to raise the arms and mower units.

ADOLPH RONNING.

DISCLAIMER 1,957,079.—*Adolph Ronning*, Minneapolis, Minn. POWER DRIVEN MOWING MACHINE. Patent dated May 1, 1934. Disclaimer filed June 19, 1935, by the assignee, *Toro Manufacturing Company*.

Hereby enters this disclaimer to claim 1 of said Letters Patent which is in the following words, to wit:

"1. The combination with a tractor having a steerable unit supporting the front end thereof, of a gang of lawn mower units arranged adjacent the forward end of the tractor and connected therewith, and means operative independently of forward movement of the tractor for shifting at least one of the units transversely of the machine and in conjunction with the operation of said steerable tractor unit, said shifting means being separate from but operatively connected with the steerable unit."

[*Official Gazette July 16, 1935.*]